US010625464B2

(12) United States Patent
Juriasingani et al.

(10) Patent No.: US 10,625,464 B2
(45) Date of Patent: Apr. 21, 2020

(54) BRANDING INDENTER

(71) Applicant: ENTRUST DATACARD CORPORATION, Shakopee, MN (US)

(72) Inventors: Rajesh K. Juriasingani, Chaska, MN (US); Donald J. Galles, Blaine, MN (US); Patrick C. Cronin, Savage, MN (US); Alexander K. Zaborowski, Minneapolis, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 393 days.

(21) Appl. No.: 14/441,712

(22) PCT Filed: Nov. 9, 2012

(86) PCT No.: PCT/US2012/064320
§ 371 (c)(1),
(2) Date: May 8, 2015

(87) PCT Pub. No.: WO2014/074103
PCT Pub. Date: May 15, 2014

(65) Prior Publication Data
US 2015/0290872 A1    Oct. 15, 2015

(51) Int. Cl.
*B29C 59/02*    (2006.01)
*B42D 25/425*    (2014.01)
(Continued)

(52) U.S. Cl.
CPC ............. *B29C 59/026* (2013.01); *B29D 7/00* (2013.01); *B32B 3/30* (2013.01); *B32B 7/12* (2013.01);
(Continued)

(58) Field of Classification Search
None
See application file for complete search history.

(56) References Cited

U.S. PATENT DOCUMENTS 6,227,572 B1 *   5/2001   Lyen ................. B41M 3/16
101/3.1
2004/0239097 A1   12/2004   Boehm et al.
(Continued)

FOREIGN PATENT DOCUMENTS

AU    488652    4/1976
CA    2263616   9/2000
(Continued)

OTHER PUBLICATIONS

The Extended European Search Report issued in European Application No. 12887887.3, dated Aug. 30, 2016, total 15 pages.
(Continued)

*Primary Examiner* — Matthew J Daniels
*Assistant Examiner* — Mohammad M Ameen
(74) *Attorney, Agent, or Firm* — Hamre, Schumann, Mueller & Larson, P.C.

(57) ABSTRACT

A heated indenter is provided for indenting a personalized document to create a security impression thereon. The personalized document includes but is not limited to, identification cards, driver's licenses, credit and debit cards, and the like. The security impression can provide a visible or tactile security feature that can be recognized by one with little or no training. The security impression causes a laminate layer of the document to tear or disfigure when attempting to remove the laminate layer from a substrate of the document.

7 Claims, 6 Drawing Sheets

(51) Int. Cl.
| | |
|---|---|
| *B42D 25/23* | (2014.01) |
| *B42D 25/45* | (2014.01) |
| *B42D 25/309* | (2014.01) |
| *B32B 7/12* | (2006.01) |
| *B42D 25/22* | (2014.01) |
| *B42D 25/324* | (2014.01) |
| *B29D 7/00* | (2006.01) |
| *B32B 3/30* | (2006.01) |
| *B32B 27/08* | (2006.01) |
| *B32B 27/36* | (2006.01) |
| *B32B 38/06* | (2006.01) |
| *B29K 67/00* | (2006.01) |

(52) U.S. Cl.
CPC .............. *B32B 27/08* (2013.01); *B32B 27/36* (2013.01); *B42D 25/22* (2014.10); *B42D 25/23* (2014.10); *B42D 25/309* (2014.10); *B42D 25/324* (2014.10); *B42D 25/425* (2014.10); *B42D 25/45* (2014.10); *B29K 2067/00* (2013.01); *B32B 38/06* (2013.01); *B32B 2307/402* (2013.01); *B32B 2425/00* (2013.01); *B32B 2519/00* (2013.01)

(56) References Cited

U.S. PATENT DOCUMENTS

| | | | | |
|---|---|---|---|---|
| 2009/0091834 | A1* | 4/2009 | Ryzi | G02B 5/1842 |
| | | | | 359/575 |
| 2009/0127344 | A1* | 5/2009 | Dostmann | B42D 25/00 |
| | | | | 235/488 |
| 2009/0134534 | A1* | 5/2009 | Koivukunnas | B29C 59/026 |
| | | | | 264/1.33 |
| 2009/0280342 | A1* | 11/2009 | Minnetian | B32B 37/0007 |
| | | | | 428/500 |

FOREIGN PATENT DOCUMENTS

| | | |
|---|---|---|
| CN | 2680604 Y | 2/2005 |
| CN | 1649743 A | 8/2005 |
| CN | 1649744 A | 8/2005 |
| FR | 2561015 | 9/1985 |
| JP | 2003-526550 | 9/2003 |
| KR | 20090109271 A | 10/2009 |
| KR | 10-2011-0018422 | 2/2011 |
| WO | 84-02309 | 6/1984 |
| WO | WO-84-02309 A1 * | 6/1984 |
| WO | 2005056304 | 6/2005 |
| WO | 2006016004 | 2/2006 |

OTHER PUBLICATIONS

Rudolf L. van Renesse, "Optical Document Security (Third Edition)", 2005, Artech House, Boston / London, XP002757192, ISBN: 1-58053-258-6, p. 84 (total 3 pages).

Partial supplementary European Search Report for European Application No. 12887887.3, dated May 24, 2016 (6 pages).

International Search Report and Written Opinion for International Application No. PCT/US2012/064320, dated May 15, 2013, 11 pgs.

Chinese Office Action, Chinese Patent Application No. 201280078107.7, dated Apr. 5, 2017 with partial English translation (9 pages).

Office Action issued in Chinese Patent Application No. 201280078107.7, dated Aug. 30, 2018, with English translation (21 pages).

Decision to Grant; Korean Patent Application No. KR 10-2015-7012854, dated Dec. 27, 2019 (2 pages).

* cited by examiner

BRANDING INDENTER

FIELD

This disclosure relates to producing a security feature on personalized documents, such as plastic cards including identification cards, credit and debit cards, and the like. More particularly, this disclosure relates to utilizing a heated indenter to produce a security feature on a personalized document.

BACKGROUND

Indenting or embossing personalized documents such as identification cards, credit and debit cards, driver's licenses, and the like, to create security features, is well known. Some of the cards may have a laminate layer laminated on a substrate. On some cards, after a security feature has been created on the card, efforts are made to tamper with the card by removing the laminate layer.

Further improvements to security measures to resist alteration, forgery or tampering with personalized documents, are needed.

SUMMARY

Systems and methods for utilizing a heated indenter for indenting a personalized document to create a security impression, are provided. The personalized document includes, but is not limited to, identification cards, driver's licenses, credit and debit cards, and the like. The term "personalized" is intended to encompass documents that have personalization applied to them at the time of creation of the security impression, as well as documents that do not have any applied personalization and that are to be personalized.

The security impression described herein can provide a visible or tactile security feature that can be recognized by one with little or no training. For a card with a security impression described herein, a laminate layer of the card tears or disfigures when attempting to remove the laminate layer from a substrate of the card. The security impression described herein can remain on the card after the laminate layer is removed.

In one embodiment, a personalized document includes a substrate having first and second opposed major surfaces and perimeter edges. A laminate is laminated to the first major surface. In addition, a security impression is formed on the personalized document. The security impression includes an indentation extending into the substrate and defined by surrounding walls of the substrate, the laminate extends into the indentation, and at least a portion of the laminate that extends into the indentation is fused by heat to material forming the substrate in order to create an interfacial layer therebetween. The indentation is formed by pressing a heated indenter against the personalized document.

Because of the fusion between the laminate and the substrate, any attempt to remove the laminate from the substrate will cause the laminate to tear or disfigure at the location of the security impression.

In another embodiment, a personalization machine for personalized documents includes an indenter mechanism having a punch, and an embossed feature disposed on a surface of the punch that in use faces a surface of a personalized document that is input into the personalization device. An anvil is disposed opposite the punch to support the opposite side of the document during indenting. A document transport path is defined between the punch and the anvil along which a personalized document is transported, which allows the personalized document to be brought between the punch and the anvil. The punch is movable toward and away from the anvil between a retracted position where the embossed feature is not engaged with the surface of the personalized document and an indenting position where the embossed feature is in engagement with the surface. In addition, a heater is configured to heat the embossed feature. The heated embossed feature can then be used to create the security impression, with the heat from the embossed feature fusing the laminate to the substrate.

In another embodiment, a method of forming a security impression on a personalized document includes heating an embossed feature disposed on a surface of a punch, and bringing the heated embossed feature into engagement with a surface of the personalized document so as to indent the embossed feature into the surface of the personalized document. The heated embossed feature creates the security impression with the heat from the embossed feature fusing the laminate to the substrate.

A personalized document that includes the security impression described herein may also include one or more standard security features known in the art such as, for example, personal data and/or a portrait image, a hologram, a paper watermark, micro text, and/or hidden features. A combination of the security features can enhance tamper-resistance.

DRAWINGS

DETAILED DESCRIPTION

Figure 1A:
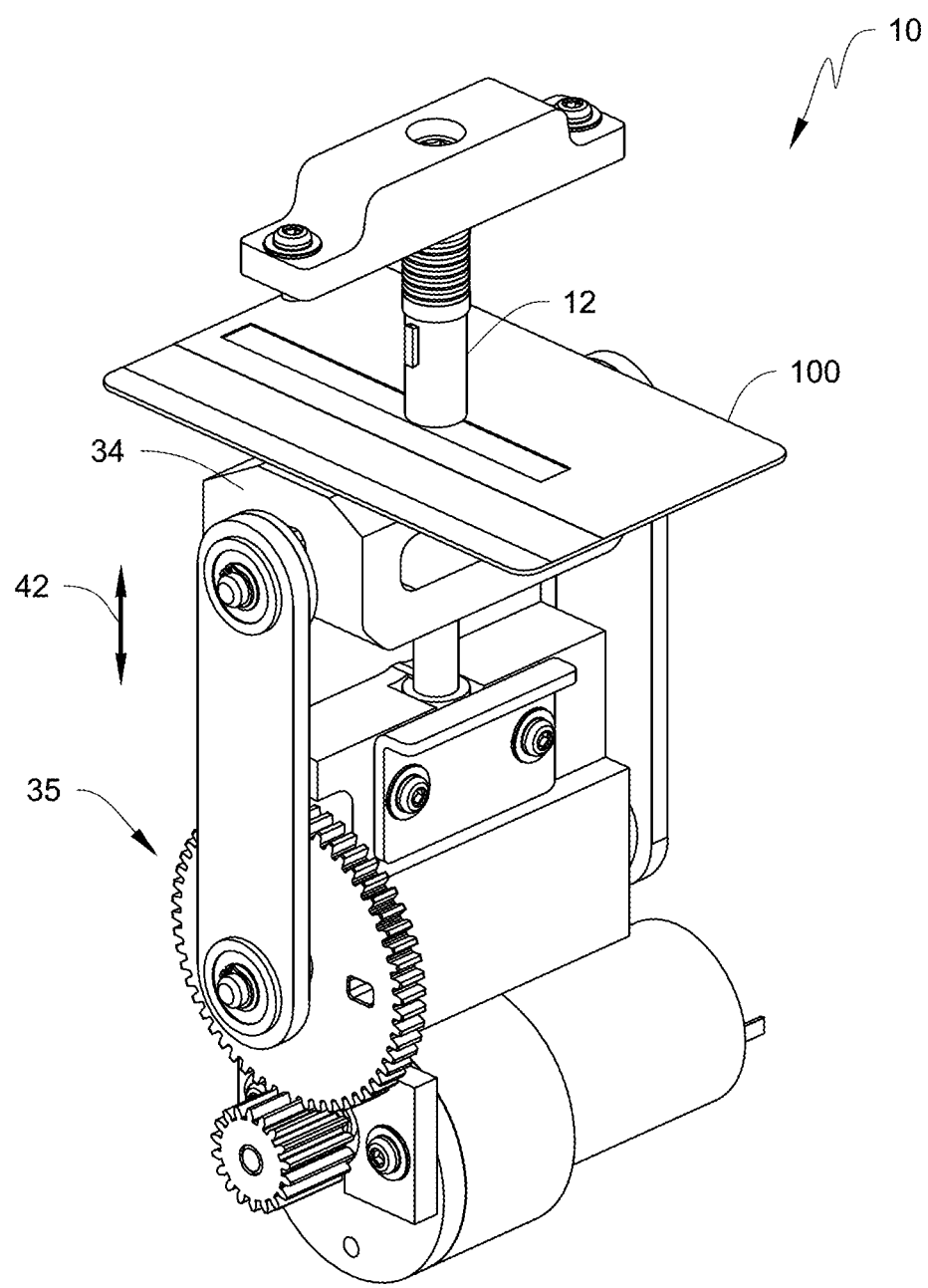
FIG. 1A is a perspective view of an indenter with a heated punch to indent a card to create a security impression thereon, according to one embodiment.

FIG. 1A illustrates an indenter mechanism 10 for indenting a card 100 to create a security impression thereon, according to one embodiment. The card 100 is held in place by an anvil 34, facing the indenter 10. The indenter 10 includes a punch 12 for indenting or embossing the card 100. The anvil 34 is disposed opposite the punch 12 for supporting the opposite side of the card 100 from the punch 12 while indenting. In some embodiments, the card can be held in place or positioned by a set of rollers on both or one side of the card.

A document transport path is defined between the punch 12 and the anvil 34 along which the card 100 is transported during processing. However, during indenting, the card 100 is fixed in position along the transport path between the anvil 34 and the punch 12. A gearing mechanism 35 can move the punch 12 toward and away from the card 100 in the direction of an arrow 42 between a retracted position and an indenting position. At the retracted position, the punch 12 is not engaged with the card 100. At the indenting position, the punch 12 indents the card 100. It is to be understood that any known mechanism for holding the card 100 and the punch 12 can be utilized. It is to be understood that the card can be moved toward and away from the punch.

The term "security impression" described herein refers to a security feature on a personalized document that is a pattern of indentation. In some embodiments, the security impression can be created using heat and indentation.

The term "indenter" used herein refers to a mechanism that can be used to create a security impression.

The term "melt into" or "fuse" described herein refers to a process of inter-diffusion between a laminate layer and an underneath substrate to form an interfacial layer that can bond the laminate layer and the underneath substrate.

The term "embossed feature" described herein refers to a portion raised from a surface of an indenter which forms the indented security impression.

Figure 1B:
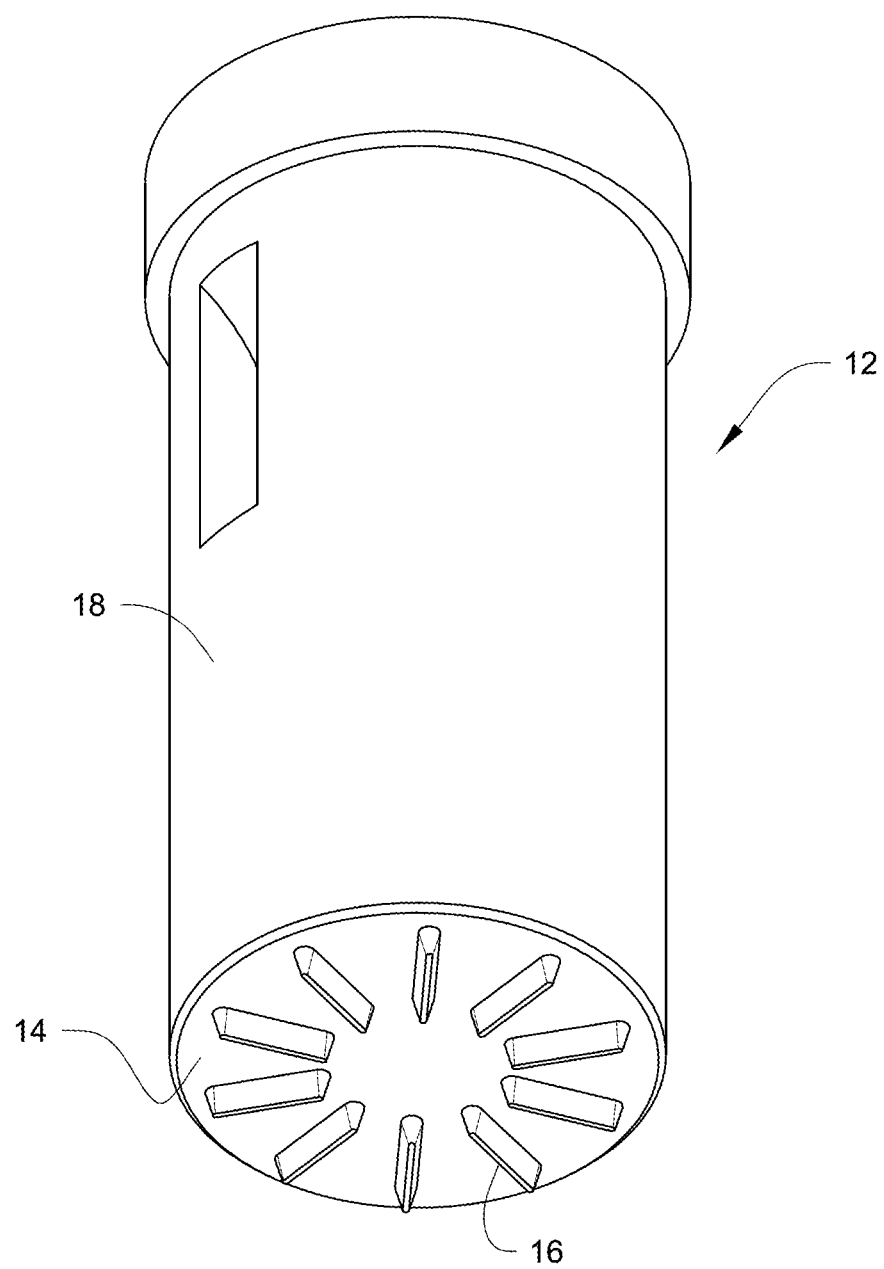
FIG. 1B is an isometric side view of the punch of FIG. 1A.

As shown in FIG. 1B, the punch 12 includes a punch body 18 which is cylindrical-shaped. An embossed feature 16 is disposed on a surface 14 of the punch body 18 that in use faces the card 100. The embossed feature 16 corresponds in shape to the security impression to be created on the card 100. The shape of the security impression/embossed feature illustrated in FIGS. 1A and 1B is exemplary only, and it is to be understood that the security impression, as well as the punch body 18 itself, can be any other suitable shape.

The illustrated exemplary embossed feature 16 includes, for example, a star pattern image having a diameter of, e.g., 0.375 inches (0.95 cm). The embossed feature 16 is raised from the surface 14. The surface 14 of the indenter that includes the embossed feature 16 is a flat surface. It is to be understood that the surface 14 can also be a curved surface that can be pressed against a card by, e.g., rolling. It is to be understood that the embossed feature 16 can be a raised pattern including numbers, characters, images, regular or irregular windows, etc. The size of the embossed feature 16 can be any desired size. In some embodiments, the size of the embossed feature 16 can be, for example, about 0.010 square inches (6.45 mm²).

The embossed feature 16 has a height measured from the surface 14 to the top of the raised pattern to be around 0.020 inches (0.508 mm). It is to be understood that the height of the embossed feature can be varied. In some embodiments, the height of the embossed feature can be about 0.005 inches to about 0.020 inches (0.127 mm to 0.508 mm).

The embossed feature 16 shown in FIG. 1B includes the star pattern image. It is to be understood that the embossed feature can include any pattern. In some embodiments, the embossed feature can be formed in the shape of a territorial boundary of a country, region, territory, state, or city, for example the State of Minnesota.

Figure 2:
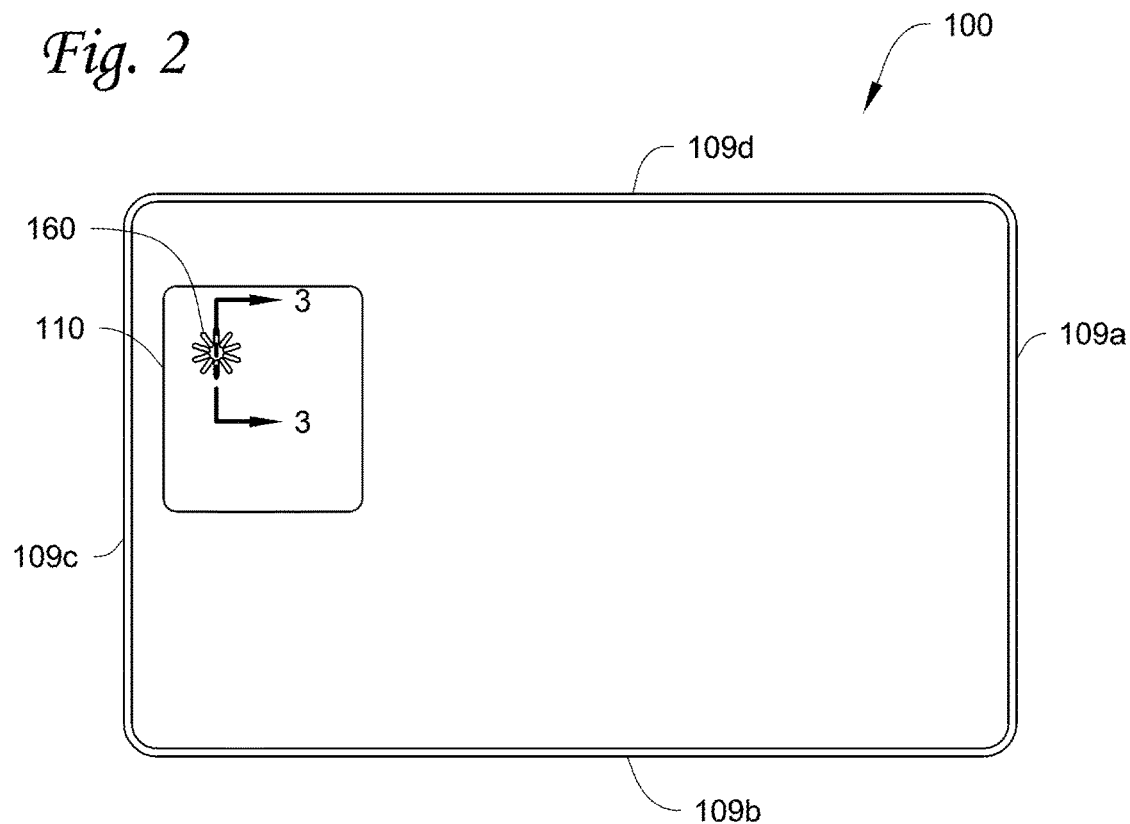
FIG. 2 is a view of front side of a personalized document having a security impression that is created by a heated indenter, according to one embodiment.
Figure 3:
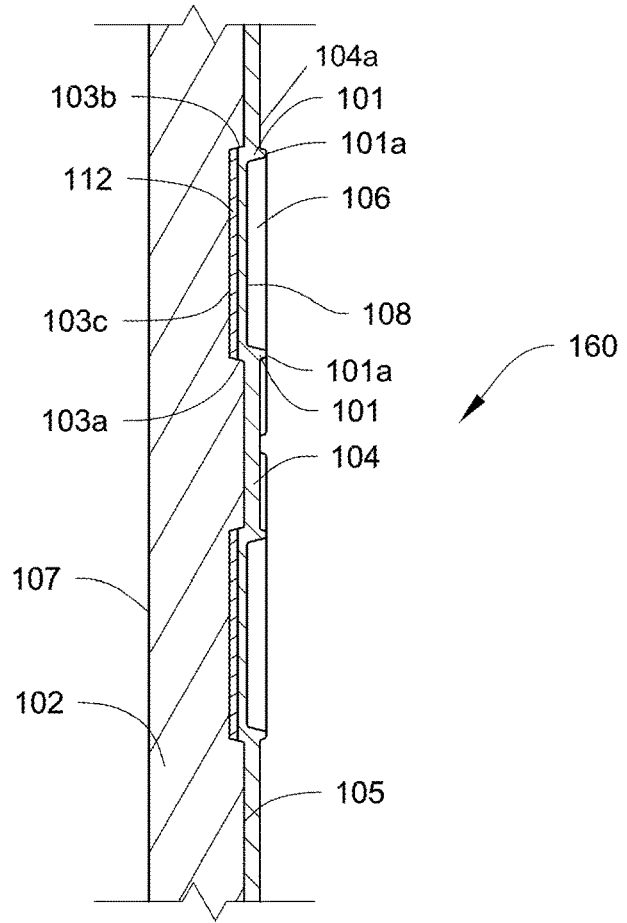
FIG. 3 is a cross sectional view of the personalized document of FIG. 3, with the structure greatly enlarged.

With reference to FIGS. 2 and 3, an example of a card 100 that has been indented with the security impression is illustrated. The card 100 has a thickness of about 0.030 inches (0.762 mm). In some embodiments, the card can have a thickness of about 0.010 inches to about 0.050 inches (0.254 mm to 1.270 mm) with about +/−10% range on the thickness. The card 100 includes a substrate 102. The substrate 102 is in the shape of the card 100. The substrate 102 includes a first major surface 105, a second major surface 107 opposite the first major surface, and perimeter edges 109a-d.

The substrate 102 is formed predominantly from a single type of plastic (e.g. polyvinyl chloride or PVC, polyethylene terephthalate or PET, polycarbonate). In some embodiments, the substrate can be formed from different types of plastics and/or from multiple individual layers. In some embodiments, the substrate can be formed from eco-friendly materials, such as, for example, wood.

The card 100 further includes a laminate layer 104 on the first major surface 105. The surface 105 can be a front surface or a back surface of the card 100. FIG. 1A illustrates the security impression being applied to a signature panel on a back surface (i.e. the second major surface) of the card 100, while FIGS. 2 and 3 illustrate the security impression applied to the front surface (i.e. the first major surface).

The laminate layer 104 can be formed from, for example, a polyester material. An adhesive can be used to bond the laminate layer 104 onto the substrate 102. In some embodiments, more than one laminate layers can be formed on the substrate of the card 100, and a laminate layer can be provided on each of the first and second major surfaces.

In some embodiments, the laminate layer includes, for example, a topcoat layer that can be applied to the surface of a card.

In some embodiments, the laminate layer may not be in the shape of the card. For example, in some embodiments, the laminate can include a cut-out region for, for example, a magnetic stripe.

It is to be understood that the substrate and the laminate layer can be made of any suitable materials as long as the laminate layer can be laminated on the surface of the card, and an indenting process, which is to be described herein, can produce an indentation on the substrate through the laminate layer.

It is to be understood that the card can be any personalized document, such as, for example, an identification card, driver's license, credit and debit card, and the like. In some embodiments, a security impression described herein can be applied to a passport. The security impression can be created on, for example, a cover and/or a polycarbonate page of the passport.

Referring back to FIG. 1A, the indenter mechanism 10 can be controlled to indent or emboss the card 100 by pressing the embossed feature 16, which has been heated, against the surfaces 105, 107 of the card 100. The embossed feature 16 is heated to a predetermined temperature so that a surface portion of the card 100 that is contacted by the embossed feature 16 can also be heated.

In some embodiments, the indenter can include a heater to heat the punch body 18 such that the embossed feature that is attached to the punch body can be heated to the desired temperature. In some embodiments, the embossed feature can be directly heated without heating (or minimally heating) the punch body. It is to be understood that any suitable heating mechanisms such as, for example, a cartridge heater, a thick film heater, can be utilized to heat the embossed feature.

Once the embossed feature is heated to the desired temperature, the indenter 10 can be pressed against the card 100 for, for example, about several seconds, which time may vary as long as a security impression can be formed on the card resulting from such contact.

The predetermined temperature of the heated embossed feature 16 can be about 300° F. to about 400° F. (about 149° C. to about 204° C.). An indenting force applied by the indenter 10 on the card 100 that is sufficient to create a security impression can be less than, for example, about 75 pounds (34 kg). A conventional indenter without heating may need an indenting force of about 300 to 400 pounds (136 kg to 181 kg) to create an indentation on the card.

Generally, the indenting force needed in the embodiments described herein is about 1/10 to about 1/4 of that needed for a conventional indenter without heating. The decreased indenting force may be due to, for example, softening of the card, or the change of molecular structure of the card upon heating. It is to be understood that the temperature and the indenting force used in the embodiments described herein may depend on other parameters such as the material of the laminate layer of the card, the material of the substrate of the card, the thickness of the laminate layer, the specific security impression to be formed on the card, the sharpness of the edge(s) on the embossed feature, etc.

In an indenting process according to one embodiment, the embossed feature 16 is heated and pressed against the surface of the card to create a security impression thereon. The portion of the laminate layer of the card that is in contact with the embossed feature 16 is also heated. The laminate layer at least partially melts into the underneath substrate to form an interfacial layer where some of the material of the laminate layer is fused with the material of the substrate at the location of the security impression. In this way, the security impression is formed that is an indent on the surface of the card, which corresponds to the embossed feature 16 of the indenter 10.

In some embodiments, it is possible to heat a portion of the card to a predetermined temperature, and the embossed feature 16 can be pressed against the heated portion of the card to form the security impression, or a combination of heating the embossed feature and heating the card can be used.

FIG. 2 illustrates the card 100 with a security impression 160, according to one embodiment. FIG. 3 illustrates a cross sectional view of the card 100 taken along line 3-3 of FIG. 2. The card 100 includes the substrate 102 and the laminate layer 104 disposed on the first major surface 105 of the substrate 102. During the formation of the security impression 160, an indentation 106 is formed on the substrate 102 and the laminate 104. The indentation 106 extends into the substrate 102 and is defined by surrounding walls 103*a-c* of the substrate 102. The laminate 104 has a portion 108 that extends into the indentation 106. The portion 108 forms a bottom of the indentation 106 and a side wall 101 which further defines the indentation 106. In addition, at least a portion of the portion 108 of the laminate layer 104 that extends into the indentation 106 is fused by heat to or melts into the material of the substrate 102 to form an interfacial layer 112. FIG. 3 shows the interfacial layer 112 formed on the bottom wall 103*c*. It is to be understood that the interfacial layer can be formed on the side walls.

During the formation of the indentation 106, the periphery of the portion 108 forms the side wall 101 which further defines the indentation 106. The side wall 101 is a joining portion of the laminate layer 104 that connects the portion 108 extending into the substrate 102 with an un-indented portion 104*a* of the laminate layer 104. The surrounding wall 101 includes a protrusion 101*a* that defines an opening of the indentation 106. The protrusion 101*a* extends above the surface of the un-indented portion 104*a* of the laminate layer 104 so that a transition from the surface of the un-indented portion 104 to the surface of the portion 108 encounters a bump, i.e., the protrusion 101*a*, before reaching the bottom of the indention 106. The surrounding wall 101 including the protrusion 101*a* can act as tactile feature that helps the security impression 160 to be recognized by one with little or no training.

As illustrated in FIG. 3, the indentation 106 extends only partially into the card 100 so that the second major surface 107 directly opposite the indentation is planar. However, in some embodiments, the indentation 106 may extend through the substrate 102 and form a raised, embossed feature on the second major surface directly opposite the indentation.

Because of the formation of an interfacial layer such as, for example, the interfacial layer 112 shown in FIG. 3, the laminate layer 104 tears or disfigures at the location of the security impression 160 if one attempts to remove the laminate layer. In some embodiments, where the interfacial layer is formed, some of the laminate layer may remain behind if the laminate layer is removed.

In some embodiments, the portion of the laminate layer that extends into the indentation may be partially burned away from the card 100. However, as long as an interfacial layer is formed therebetween, the laminate layer still tears or disfigures at the location of the security impression if one attempts to remove the laminate layer, and where the interfacial layer is formed, some of the laminate layer may remain behind if the laminate layer is removed.

In some embodiments, the laminate layer 104 includes more than one laminate layer. At least the layer in direct contact with the substrate 102 melts into the substrate 102. In some embodiments, the multiple laminate layers 104 may also melt and mix together with the underneath substrate 102 to form the interfacial layer 112.

As shown in FIG. 2, the card 100 can also include a portrait image 110 of the intended card holder that can be printed on the card 100. The security impression 160 can be located anywhere on the card. But in one example, the security impression 160 can be located on the portrait image 110, for example on the forehead and/or the lower jaw of the intended card holder. In addition, more than one security impression can be disposed on the portrait image or anywhere else on the card.

In some embodiments, the card does not include the laminate layer and the security impression can be directly formed on the substrate.

In some embodiments, a security impression such as, for example, the security impression 160, can have a color that has a contrast with material forming the laminate layer or the substrate.

In some embodiments, a foil containing a colorant material can be disposed between a card and a punch, such as the card 100 and the punch 12 shown in FIG. 1*a*. When the card 100 is indented by the heated, embossed feature 16 of the punch 12 for creating a security impression such as the security impression 160 shown in FIG. 3, the colorant material can be transferred from the foil to the card 100. The colorant material can be transferred into at least a portion of the security impression. In some embodiments, a colorant layer can be formed on a surface of the security impression. In some embodiments, the colorant material can penetrate into the interfacial layer 112, or even into the substrate 102. The security impression can be colored by the colorant material so that a contrast can be formed between the security impression and the material forming the laminate or the substrate. After transferring of the colorant material, the foil can be removed therefrom without tearing or disfiguring the laminate layer 104.

In some embodiments, a laminate layer such as the laminate layer 104 shown in FIG. 3, after indented by, for example, the heated, embossed feature 16 of the punch 12 for creating a security impression, can change its color for at least a portion of the created security impression.

Figure 4:
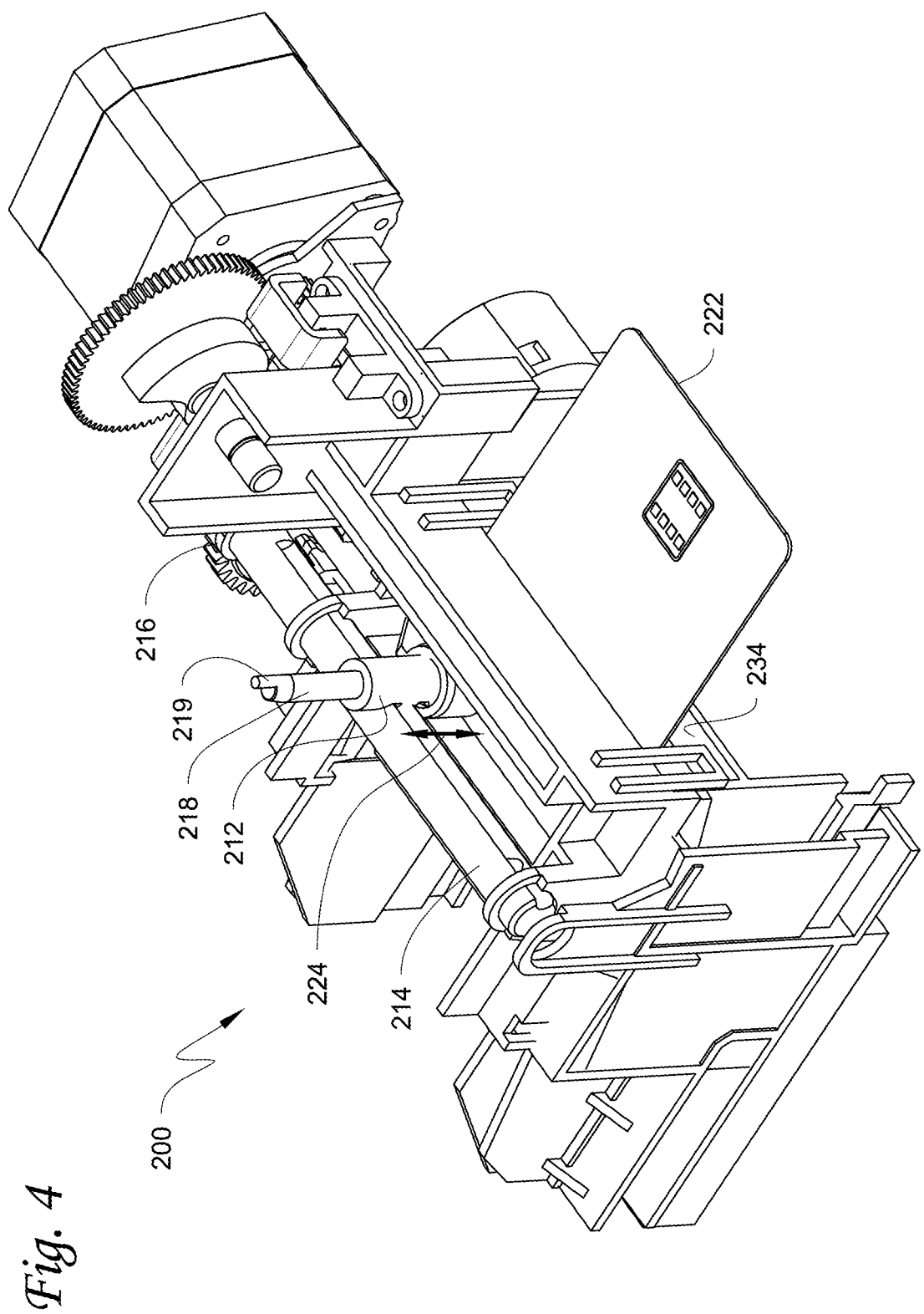
FIG. 4 is a perspective view of an indenter with a heated punch to indent a card to create a security impression thereon, according to another embodiment.

FIG. 4 is a perspective view of an indenter 200 for indenting a card 222 to create a security impression thereon, according to another embodiment. The indenter 200 includes a punch 212 that is mounted on an arm 214. The arm 214 can be rotatable to adjust the position of the punch 212 relative to the card 222. The arm 214 is connected to a cam mechanism 216 that can rotate the arm 214 to move the punch 212 vertically in the direction of an arrow 224 such that the punch 212 can press against the card 222. The card 222 is held in place by an anvil 234. The anvil 234 is disposed opposite the punch 212 for supporting the opposite side of the card 222 from the punch 212 while indenting. It is to be understood that the location of the punch 212 with respect to the card 222 can be adjusted by moving the card 222 or by moving the punch 212. The punch 212 includes an embossed feature (not shown) on a surface thereof.

The arm 214 can move the punch 212 toward and away from the anvil 234 between a retracted position and an indenting position. At the retracted position, the embossed feature is not engaged with the surface of the card 222. At the indenting position, the embossed feature is in engagement with the surface.

The punch 212 further includes a heater 218 to heat the embossed feature to a predetermined temperature during an indenting process. The heater 218 is attached to a post 219 protruding from the punch 212. In some embodiments, the heater can be positioned into a hole within the punch. In some embodiments, the embossed feature can be pre-heated before the embossed feature is pressed against the card. In some embodiments, the embossed feature can be heated when the embossed feature is pressed against the card. In some embodiments, the embossed feature can be selectively heated so that a portion of the embossed feature can be copied onto the card 222.

Figure 5:
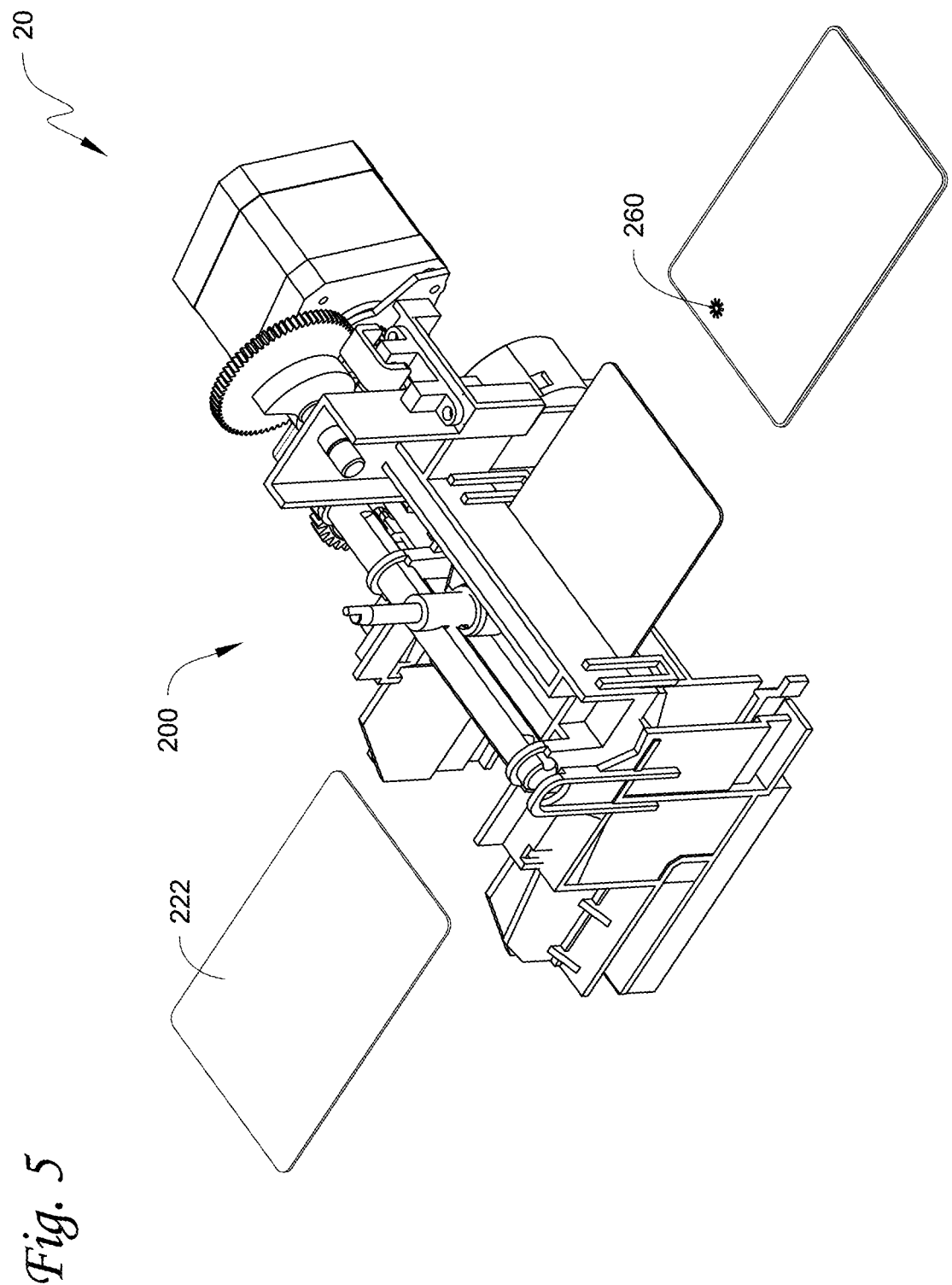
FIG. 5 illustrates the indenter of FIG. 4 as a part of a personalization machine.

FIG. 5 illustrates a personalization device 20 which includes the indenter 200 of FIG. 4, according to one embodiment. The personalization device 20 can be a desktop card printer for producing personalized documents. The personalization device 20 can also be a central card issuance system that can produce personalized documents.

The device 20 can also include at least a printing mechanism and a laminating mechanism disposed upstream of the indenter 200 along the card transport path. The printing mechanism is configured to print an image, for example the portrait image 110, on the card, followed by laminating the lamination layer 104 over the card to protect the portrait image and the remainder of the card.

After the card 222 has been laminated, it is transferred into the indenter 200. The indenter 200 receives the card 222 and indents the card 222 with the heated embossed feature to create a security impression 260.

Figure 6:
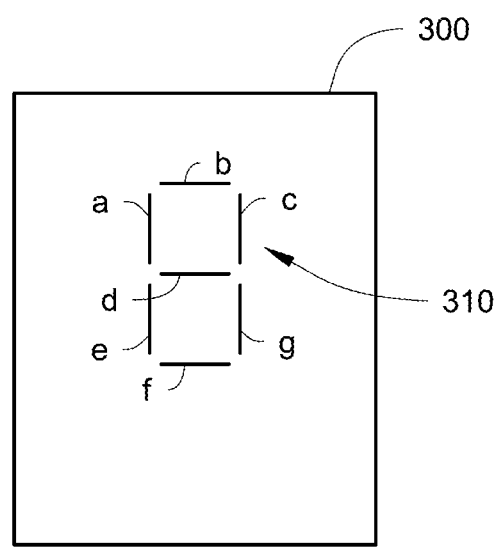
FIG. 6 illustrates a view of a front side of an embossed feature, according to one embodiment.

FIG. 6 illustrates an embossed feature 300 formed on a surface of a punch that can be used to create a security impression including one or more numbers on a personalized document, according to one embodiment. The embossed feature 300 includes a pattern 310 that includes seven lines a through g. In some embodiments, each of the lines can be individually controlled to be heated or not heated such that the heated lines can form various numbers, e.g., integers 0 through 9. In some embodiments, a security impression with one or more numbers such as, for example, the pattern 310, can be created on a personalized document.

It is to be understood that the pattern 310 can include but not limited to any ASCII character. In some embodiments, characters similar to the pattern 310 can be aligned in rows and/or columns to create a security impression such as, for example, account numbers, birth date, etc., on a personalized document.

In some embodiments, an embossed feature such as, for example, the embossed feature 16 shown in FIG. 1B and the embossed feature 300 shown in FIG. 6 can be utilized to create the same security impression on different cards. In some embodiments, the orientation of the punch can be changed to change the orientation of the embossed feature, thereby changing the resulting orientation of the security impression on the card. In some embodiments, the same security impression can be provided on a card in multiple orientations.

The embodiments disclosed in this application are to be considered in all respects as illustrative and not limitative. The scope of the claimed invention is indicated by the appended claims rather than by the foregoing description; and all changes which come within the meaning and range of equivalency of the claims are intended to be embraced therein.

The invention claimed is:

1. A method of forming a security impression on a personalized document that includes a plastic substrate and a laminate, comprising:
   heating an embossed feature disposed on a surface of a punch; and
   bringing the heated embossed feature into engagement with the laminate and the plastic substrate so as to form an indentation in a surface of the plastic substrate with a portion of the laminate extending into the indentation, at least the portion of the laminate that extends into the indentation being fused by the heat of the heated embossed feature to material forming the plastic substrate in order to create an interfacial layer therebetween,
   where because of the fusion of the laminate to the plastic substrate, the laminate tears or disfigures at the location of the indentation when attempting to remove the laminate from the plastic substrate.

2. The method of claim 1, comprising heating the embossed feature to a temperature of about 149° C. to about 204° C.

3. The method of claim 1, comprising bringing the heated embossed feature into engagement with the laminate and the plastic substrate with a force that is about 1/10 to about 1/4 of a force needed for the embossed feature to indent into the plastic substrate without heating.

4. The method of claim 1, wherein the plastic substrate is in the shape of a card, and the laminate is a polyester layer or a topcoat layer.

5. The method of claim 1, further comprising forming a tactile feature, including forming a protrusion of the laminate that defines an opening of the indentation, the protrusion extending above a surface of an un-indented portion of the laminate.

6. The method of claim 1, further comprising coloring the security impression by disposing a foil between the personalized document and the embossed feature, the foil containing a colorant material.

7. The method of claim 1, wherein the laminate is a foil.

* * * * *